US 8,538,429 B2

(12) United States Patent  
Piercy et al.

(10) Patent No.: US 8,538,429 B2
(45) Date of Patent: Sep. 17, 2013

(54) HANDOVER TO AN UNLICENSED MOBILE NETWORK

(75) Inventors: Neil Philip Piercy, Hertfordshire (GB); Nicholas Dougall Johnson, London (GB); David C. Brock, Cambridge (GB)

(73) Assignee: IP.Access Limited, Camboune, Cambridge (GB)

( * ) Notice: Subject to any disclaimer, the term of this patent is extended or adjusted under 35 U.S.C. 154(b) by 587 days.

(21) Appl. No.: 11/995,657

(22) PCT Filed: Jul. 14, 2006

(86) PCT No.: PCT/GB2006/050205
§ 371 (c)(1),
(2), (4) Date: Feb. 2, 2010

(87) PCT Pub. No.: WO2007/010304
PCT Pub. Date: Jan. 25, 2007

(65) Prior Publication Data
US 2010/0130199 A1    May 27, 2010

(30) Foreign Application Priority Data
Jul. 15, 2005    (GB) .................................. 0514438.1

(51) Int. Cl.
*H04W 36/08* (2009.01)
*H04W 36/34* (2009.01)

(52) U.S. Cl.
USPC .......................................... 455/436; 455/434

(58) Field of Classification Search
USPC ....... 455/414, 422.1, 434–444; 370/328–338
See application file for complete search history.

(56) References Cited

U.S. PATENT DOCUMENTS

| 7,818,006 | B2* | 10/2010 | Kim et al. ...................... 455/436 |
| 2004/0156399 | A1* | 8/2004 | Eran .............................. 370/913 |
| 2004/0192211 | A1* | 9/2004 | Gallagher et al. .......... 455/67.11 |
| 2005/0101328 | A1 | 5/2005 | Son et al. |
| 2007/0281696 | A1* | 12/2007 | Vikberg et al. ............... 455/436 |
| 2008/0076398 | A1* | 3/2008 | Mate et al. .................. 455/414.2 |
| 2010/0093354 | A1* | 4/2010 | Agashe et al. ................ 455/436 |

FOREIGN PATENT DOCUMENTS

KR    1020050044220    5/2005
WO    2005076648 A1    8/2005

OTHER PUBLICATIONS

Chinese Office Action; Chinese Patent Application No. 200680031368.8; Dated: Apr. 21, 2011.
European Communication Pursuant to Article 94(3) EPC; European Patent Application No. 06 765 354.3-2412; Dated: Sep. 9, 2009.
Japanese Office Action; Japanese Patent Application No. 2008-520965; Dated: Aug. 9, 2011.

(Continued)

*Primary Examiner* — Kashif Siddiqui
(74) *Attorney, Agent, or Firm* — Fitch Even Tabin & Flannery LLP (57) ABSTRACT

A cellular radio telecommunication handover system and method for enabling the handover of a mobile telecommunications device between a licensed (cellular) network and an unlicensed mobile network comprising a plurality of low power access points having all of them the same common cell identity (GGI) is disclosed. The mobile telecommunications device establishes a handover between one access point of the licensed network and another access point of the unlicensed network by communication of handover resources therebetween.

16 Claims, 5 Drawing Sheets

(56) References Cited

OTHER PUBLICATIONS

Umatoday.com, "Unlicensed Mobile Access (UMA) Architecture (Stage 2)" R1.0.3, Feb. 28, 2005, pp. 27, 44, and 50 (Paragraphs 8.2.2-8.2.3; 9.4.1.2-9.4.1.3; 9.10). Retrieved from the Internet: http://www.umatechology.org/specifications/index.htm> on Jan. 14, 2008.
Chinese Office Action; Chinese Patent Application No. 10-2008-7003685; Dated: Sep. 26, 2012.

* cited by examiner

HANDOVER TO AN UNLICENSED MOBILE NETWORK

The present invention relates to a cellular radio telecommunications handover system and particularly, but not exclusively, to cellular radio telecommunications handover system for use in low-power networks.

Low Power Global System for Mobile Communication (LP-GSM) networks, 3G (UTMS) or any other Low Power cellular radio telecommunications protocol, generally have a number of "Access Points" (APs) appearing as a single cell, by sharing a single Cell Identity to reduce the configuration required in the macro Base Station Subsystems (BSSs).

In the LP network, a mobile station (MS) requires to instigate a handover process when moving between APs during a call. When the handover process is instigated, the MS reports details of the APs in range to a Base Station Controller (BSC) using a handover required message.

This Cell Identity-sharing leads to ambiguity of AP identity when a hand-in is made to the LP network, as the specific AP being measured and targeted for handover is not known. This ambiguity can be solved according to this invention by using the normal 3GPP messaging over the air interface, but using a novel technique in the LP-AP access network.

Problem Statement

There are various established methods for performing a handover of a wireless terminal device between wireless basestations forming part of a larger communications network. The methods generally fall into two categories. In the first category the terminal device forms a connection to the new basestation before breaking the connection to the old basestation. In the second category, the terminal uniquely identifies one or more potential new basestations and the communications network controls a scheduled handover from old to new basestation, such that the terminal device only establishes a connection to one basestation at a time.

The second method is used by the GSM system and is used in a 3G hard handover procedure. A fundamental element of this technique is that the terminal must be able to give the network enough information to uniquely identify the target (new) basestation before the handover is initiated by the network.

To perform a handover in a traditional GSM/3G system requires that each cell have a unique identity, the Cell Global Identity (CGI), together with some locally unique radio configuration. In GSM the locally unique radio configuration is a radio channel (ARFCN) and a BaseStation Identity Code (BSIC). In 3G the locally unique radio configuration is a frequency and a scrambling code. During a call, the GSM Mobile Station (MS) or 3G User Equipment (UE) measures the strength of the surrounding basestation signals, and reports them to the access network controller (GSM BSC or 3G RNC) of its host basestation together with the locally unique radio configuration of the target basestation associated with the measurements. If the access network controller decides that a handover to the basestation is required, it looks up the locally unique radio configuration in its local provisioned database to derive the CGI of the target basestation.

It then requests that the access network controller of the target basestation allocates resources on the target basestation to be used during handover of the MS/UE. This request is sent to the Mobile Switching Centre (MSC) for forwarding to the BSC/RNC hosting the target cell, and uses the target CGI to identify the BSC/RNC to which the request is forwarded.

In order to deploy a large number of very low power cells (termed LP-APs here) (e.g. to provide GSM/3G services within individual houses) it is not practical to require any macro cells which cover a large number of such AP cells to be provisioned with information for every AP. Indeed in the 3GPP specifications, a cell is limited to have at most 64 unique entries in its neighbour cell list, and the CGI itself has a limited number of unique identities.

The solution described here allows a potentially large number of LP-APs to share a single identity (CGI), and thus also share the same locally unique radio configuration. This is possible provided the APs each have very low power, such that the coverage areas from multiple APs with the same radio configuration do not overlap with each other. This then reduces the provisioning requirement in the macro network controller to a single or a few CGIs and their associated locally unique radio configuration, each providing for a set of APs.

This in itself however introduces the problem that the target basestation for a handover is no longer uniquely identified.

A controller (BSC/RNC) and the collection of APs which share the same identity (CGI and radio configuration) behave as a group according to this invention.

Note that it is still possible to use the same radio configuration associated with a different CGI in other non-overlapping geographical area—this is the normal method of cellular reuse used by GSM/3G. This reuse may be for a traditional cell and controller, or for another collection of APs and their controller, also behaving according to this invention.

Note further that a BSC/RNC behaving according to this invention may also host traditional cells each with unique CGIs, and may host one or more collections of APs each sharing a single CGI according to this invention.

Statements of Invention

According to a first aspect of the present invention there is provided method of cellular radio telecommunication handover for a mobile station (MS) to a plurality of common cell identity base transceiver stations (BTSs) comprising the steps of:
  (i) receiving measurement reports from the MS, wherein the measurement reports include information relating to at least one common cell identity BTS, thereby identifying a target BTS;
  (ii) instructing the mobile station to communicate with the common cell identity BTSs using handover resources;
  (iii) scanning a channel on at least some of the common cell identity BTS for communication from the mobile station using said handover resources; and
  (iv) receiving communication from the mobile station on one of the common cell identity BTSs, defining that common cell identity BTS as the target BTS, and completing handover between the mobile station and the target BTS.

The plurality of common base transceiver stations BTSs may be network of Low Power Access Points which share a common cell identity. The handover resources may be unique to the handover to be executed, but common between possible target BTSs. The MS may be permitted to connect to only a sub-set of the possible target BTSs.

The method may comprise passing data corresponding to the handover to a controller and updating handover resources associated with the non-target BTSs having the common cell identity.

The handover resources may comprise a pre-determined hand in channel and the target BTS initiates an intra-cell handover of the mobile station to a traffic channel to keep a predetermined hand-in channel free for other mobile station handovers. The method may comprise scanning the predetermined hand-in channel on each common cell identity BTS for communication from the mobile station at all times when the BTS is in use.

The method may comprise determining if more than one BTS has received the communication from the MS, and selecting one of the plurality of BTSs to complete step (iv) of the method should this occur. The method may comprise determining if more than one MS has transmitted the communication to the BTS simultaneously, and at 9 least one of the MSs reverting to a prior BTS should this occur.

According to a second aspect of the present invention there is provided a cellular radio telecommunication handover system comprising:

a plurality of common cell identity base transceiver stations (BTSs), each having handover resources associated therewith;

a plurality of individual base transceiver stations (BTSs) each having an individual cell identity;

a mobile station;

wherein, the mobile station is arranged to issue measurement reports of the common cell identity and individual BTSs within range and, where a handover is required to one of the plurality of common cell identity BTSs, the mobile station is arranged to communicate using the handover resources, the common cell identity BTS which receives the communication from the mobile station being arranged to complete the handover of the mobile station.

The plurality of common base transceiver stations (BTSs) may comprise a network of Low Power Access Points which share a common cell identity. The handover resources may be unique to possible target BTSs.

The MS may be arranged to be permitted to connect to only a sub-set of the possible target BTSs.

The system may comprise a controller arranged to receive data corresponding to the handover and being further arranged to update handover resources associated with non-target BTSs having the common cell identity.

The handover resources may comprise a dedicated handover channel. The BTSs may be arranged to scan the predetermined handover channel for communication from the mobile station, when in use.

A mobile station either defined according to the second aspect of the present invention, or arranged to operate as in accordance with the first aspect of the present invention.

The mobile station may comprise any one of the following: mobile telephone, personal digital assistant, laptop computer.

A base station transceiver station either as defined according to the second aspect of the present invention, or arranged to operate as in accordance with the method first aspect of the present invention.

The base station transceiver station may comprise an access point in a low power GSM network or a UMTS network.

According to another aspect of the present invention there is provided a method of cellular radio telecommunication handover for a mobile station (MS) to a plurality of common cell identity base transceiver stations (BTSs) comprising the steps of:

(i) receiving measurement reports from the MS, wherein the measurement reports include information relating to at least one common cell identity BTS, thereby identifying a target BTS;

(ii) instructing the mobile station to communicate with the common cell identity BTSs on a predetermined hand-in channel;

(iii) scanning the predetermined hand-in channel on each common cell identity BTS for communication from the mobile channel; and     (iv) receiving communication from the mobile station on one of the common cell identity BTSs, defining that common cell identity BTS as the target BTS, and completing handover between the mobile station and the target BTS.

Preferably, the plurality of common base transceiver stations (BTSs) is a network of Low Power Access Points which share a common cell identity.

Preferably, after competition of the handover, the target BTS initiates an intra-cell handover of the mobile station to a traffic channel to keep the predetermine hand-in channel free for other mobile station handovers.

According to another aspect of the present invention there is provided a cellular radio telecommunication handover system comprising:

a plurality of common cell identity base transceiver stations (BTSs), each having a predetermined hand-in channel;

a plurality of individual base transceiver stations (BTSs) each having an individual cell identity;

a mobile station;

wherein, the mobile station issues measurement reports of the common cell identity and individual BTSs within range and, where a handover is required to one of the plurality of common cell identity BTSs, the mobile station is instructed to communicate on the predetermined hand-in channel, the common cell identity BTS which receives the communication from the mobile station then completes the handover of the mobile station.

The invention is allows the operation of the hand-in procedure to a Low Power Access Point (LP-AP) network where a large number of APs appear as a single cell by sharing a single Cell Identity to reduce the configuration required in the macro network. Descriptions are given for how the invention may be embodied in both GSM (a.k.a. 2G) LP-AP networks and in 3G (a.k.a. UMTS) LP-AP networks, both now within the overall 3GPP specification framework.

BRIEF DESCRIPTION OF THE DRAWINGS

The invention will now be described, by way of example only, with reference to the accompanying drawings, in which.

OVERVIEW OF HAND-IN SOLUTION CONCEPT

Referring now to FIGS. 1 to 5.

Given the configuration described above, when a MS/UE issues measurement reports for a LP-AP to the macro controller, the macro controller perceives that there is a single neighbour cell for handover in that it has a single CGI associated with the local unique radio configuration. If the access network controller determines the desirability for the MS/UE to handover to this neighbour cell, it issues a Handover/Relocation Required message to the MSC including the CGI of the target cell. The MSC identifies the target access network controller by the CGI as being the LP-AP controller and issues a Handover/Relocation Request to the access network controller of the target LP-AP.

In a traditional network, the target access network controller selects available resources on the known target cell, informs the cell to await the incoming handover, and sends a handover command to be relayed back to the MS/UE indicating the new resources to use, together with a handover reference number (for GSM) or temporary identity (for 3G).

However, the LP-AP controller does not know at this point which particular LP-AP has been measured, so cannot do this as it does not know the actual AP to which the handover must occur, as the same CGI is associated with several APs. Instead, it acknowledges the handover/relocation request and always offers some "hand-in-resources" to be used by the MS/UE during hand-in. A handover command will be relayed back to the MS indicating the new resources and a handover reference number. The LP-AP controller may select the hand-in resources from a pre-configured set of such resources which are generally kept unused for normal traffic across all APs which share this CGI to allow such a hand-in to occur. Alternatively the LP-AP controller may allocate a unique set of hand-in resource common to all the APs that may be a target of the hand-in for this particular MS/UE. This alternative is possible if the LP-AP network imposes restrictions on which MS/UE may use each AP, such a subset typically being a very small fraction of the number of APs sharing the CGI.

The MS/UE starts to use the resources allocated to it in the handover command. When one of the APs detects the MS/UE, the AP establishes a channel with the MS/UE and informs the LP-AP controller of the handover attempt and the associated handover reference number or temporary identity.

The LP-AP controller matches the incoming handover reference or temporary identity with the list of handovers it is currently expecting, and notifies the MSC with a normal Handover Detect message. If the LP-AP controller had allocated specific resources on more than one AP for this hand-in, the unused resources on the other APs are cleared at this point. When the handover completes the controller notifies the MSC so that the MSC can initiate clearing of the resources in the old access network controller.

Meanwhile, as soon as the handover is completed and if a pre-configured hand-in resource has been used, the LP-AP controller moves the MS/UE onto a different set of resources specifically for the ongoing service provided to this MS/UE in order to free up the preconfigured hand-in resources.

The option to use pre-configured hand-in resources prevents the specific tailoring of the hand-in resources to the requirements of the MS/UE and the service that it is currently providing. For example, the pre-configured resources could not be encrypted as the keys required for such encryption are specific to a single MS/UE. Another example is that the resources may only be pre-configured for a particular speech codec, e.g. FR, which may not be the best codec or the one that is in use by the MS/UE prior to the hand-in. In such cases the subsequent immediate move of the MS/UE to the specific resources for the MS/UE and its current service requirements may restore the more appropriate service resources, with only a brief period during which the sub-optimal services are being provided.

The option to use MS/UE-specific and service-specific resources which then have to be assigned across potentially multiple APs avoids the above issue. This provides as near-seamless service to the end-user as possible, but adds load to the APs, the LP-AP controller and the network between them. How much load and whether or not this is acceptable depends on many factors, but a key factor is the number of APs which may have to have the resources allocated for each single hand-in event. For household deployments of APs where access control on each AP only allows the MS/UE of family and friends, this number may be very small, making this solution attractive.

Detailed Hand-In Sequence for GSM with Pre-Configured Resource

Figure 1:
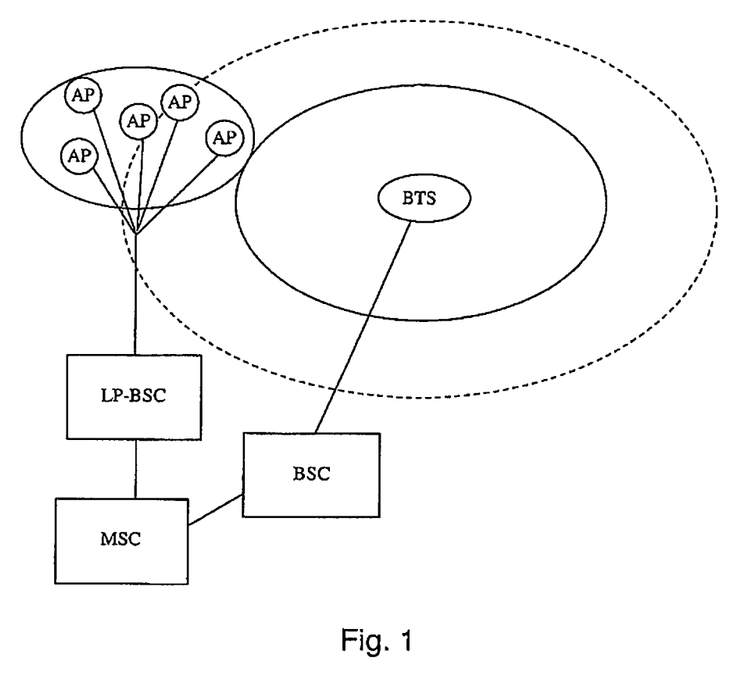
FIG. 1 is a schematic diagram of an embodiment of a cellular radio telecommunication system according to an aspect of the present invention.
Figure 2:
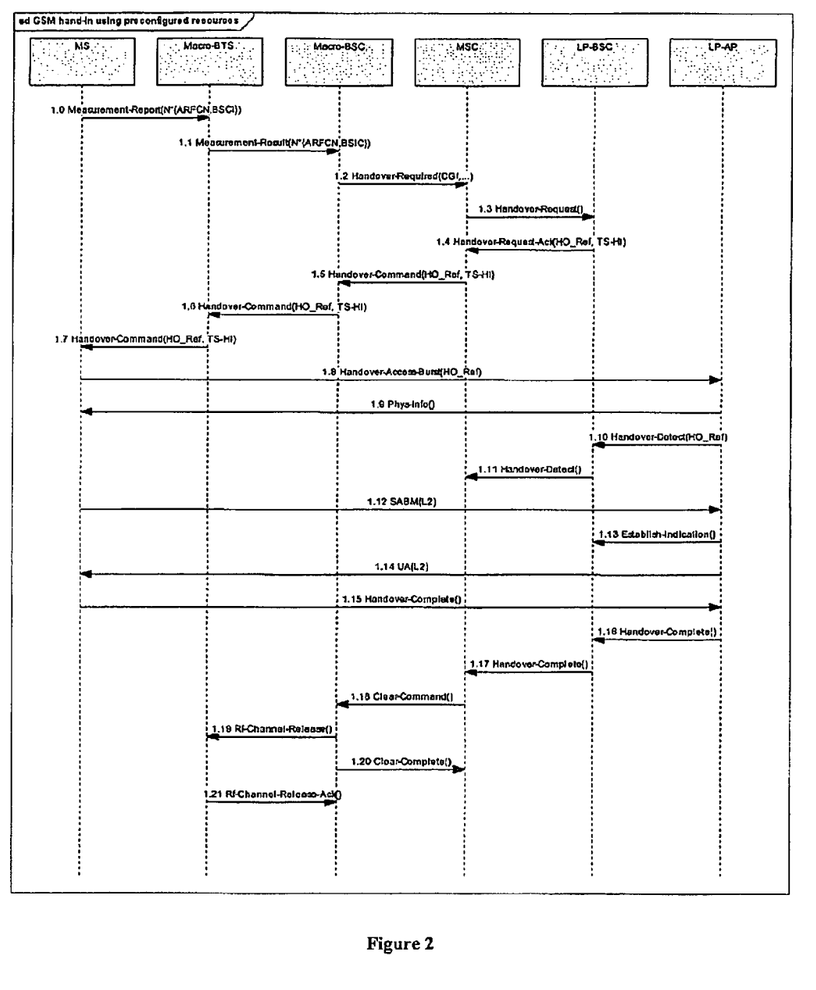
FIG. 2 is a message sequence chart describing a GSM handover method, using preconfigured resources, in accordance with an aspect of the present invention.

The procedure above is summarised in the message sequence chart shown in FIG. 1. Only a few key parameters are shown the emphasise how the mechanism works in the LP-AP context:

The ARFCN, BSIC pair in the measurement report from the MS which are the locally unique radio configuration in GSM The mapping of ARFCN, BSIC to a CGI to identify the LP-GSM BSC as the handover target The pre-assigned hand-in slot (TS-HI) selected for this hand-in returned from the LP-BSC to the MS via the macro BSS The Handover Reference (HO_Ref), used to tie the Handover Access burst to the Handover Request Note that the messaging follows a standard 3GPP handover sequence, except that normally a channel activation would be sent from the New BSC to the New BTS to identify a channel on which to expect an access burst and the use of a modified Handover Detect message. In the case of LP-AP the AP will always listen on the pre-determined hand-in resources so the channel activation is not necessary.

Other Issues for Preconfigured GSM Solution

This section describes some of the issues and the scenarios which lead them to occur, together with the likely consequences of occurrence.

Uniqueness of Handover Reference

Handover reference is an 8-bit number chosen by the new BSS, so provided the LP-GSM BSC has less than 256 hand-ins in progress per CGI there will be no ambiguity in matching an incoming handover access burst to a handover context held at the BSC.

Multiple APs Detect the Hand-In

It is theoretically possible that more than one AP may detect the same handover access burst. For this to occur the APs must be using a common ARFCN and there must be a degree of coverage overlap this is obviously undesirable but may occur in an area of high AP density. The MS will make its access burst in a relatively small time window synchronised to the AP that it has been measuring. As the APs are not synchronised to each other this significantly reduces the likelihood of the "wrong" AP detecting the access burst, with the probability being the allowed timing offset as a fraction of the frame time. For an LP-GSM AP which has very low power, the MS should be accessing the cell at very low (probably zero) timing advance due to the low range, so it is highly unlikely that 2 such APs in overlapping coverage are within the close enough timing to both detect the access attempt at such zero or low timing advance. If 2 APs do respond with a Phys Info they are likely to interfere with each other and layer 2 establishment is likely to fail. If the MS determines that there is a problem with layer 2 establishment then it will not reach the Handover Complete stage of the sequence but will instead fall back to the old BSC.

If this does occur, the BSC may see the same handover reference in 2 different Handover Detect messages. The BSC may first filter these by rejecting any from an AP with a different BSIC from that which is being used in the handover (if is handling APs with the same ARFCN but different BSIC). If there is still ambiguity, the BSC could command one of the APs to ignore the hand-in, but the hand-in is unlikely to be successful. This event is however likely to be rare enough to be an acceptable failure rate.

Concurrent Hand-Ins to the Same AP-Concurrent Access Bursts

If more than one MS issues access bursts prior to a Phys Info response then they may both detect the subsequent Phys Info and both act upon it.

One or both layer 2 establishments is likely to fail due to mutual interference. The MS(s) should revert back to the old BSS in this case.

The access bursts from the different MS would need to occur within approx 250-300 msec for this scenario to occur, so again the likelihood of this happening to a single AP within this period is low, even with the correlated behaviour of users (e.g. two users each in a call on their MSs and entering a house together), and again the failure rate is likely to be acceptable.

Concurrent Hand-Ins to the Same AP-Access Bursts after Phys Info

If a second MS initiates access bursts when Phys Info has already been issued in response to a first MS's access bursts then the later access bursts will be ignored. The lack of a Phys Info response will cause timer T3124 to expire and the second MS to fall back to the old BSS. The access bursts from the later attempt will cause interference with the handover already in progress.

No Free Channels on Target AP

If a MS initiates handover access bursts when there are no available traffic channels on an AP then the access bursts will be ignored. The lack of a Phys Info response will cause timer T3124 to expire and the second MS to fall back to the old BSS.

Detailed Hand-In Sequence for 3G with Pre-Configured Resources

Figure 3:
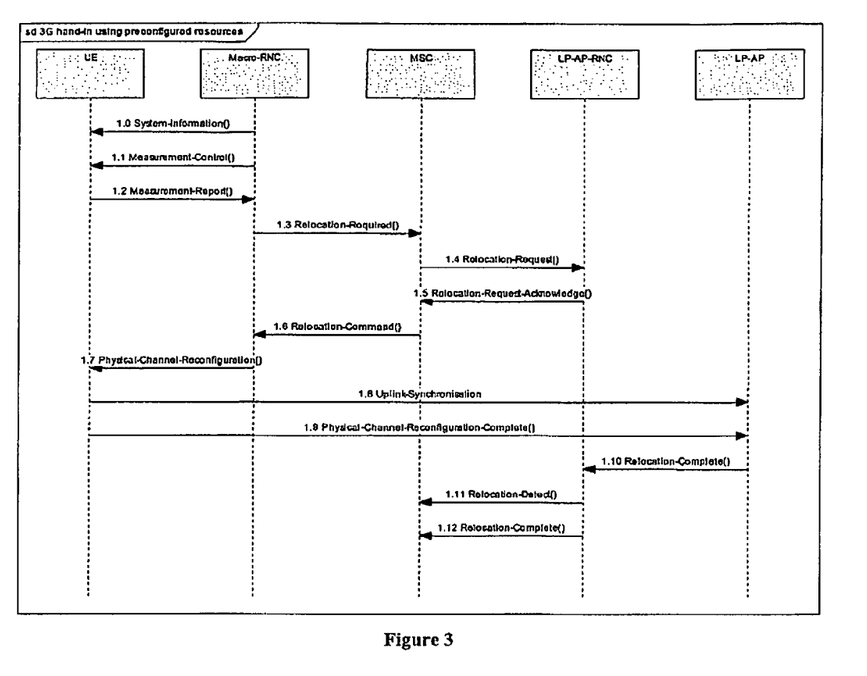
FIG. 3 is a message sequence chart describing a 3G handover method, using preconfigured resources, in accordance with an aspect of the present invention.

This scenario is shown in FIG. 3. It is analogous to the GSM scenario described above.

1.0. The macro-RNC sends the configured frequencies and scrambling codes of its neighbour cells.
1.1. The macro-RNC specifies the criteria under which the UE should issue a measurement report.
1.2. The UE sends a measurement report indicating that a specified neighbour cell meets the criteria specified by the macro-RNC.
1.3. The macro-RNC looks-up the CGI of the neighbour cell and sends it in a Relocation-Required message to the MSC.
1.4. The MSC identifies the RNC for the target cell and sends a Relocation-Request to the target RNC.
1.5. The LP-AP RNC allocates an identifier for the hand-in and returns it along with the standard hand-in-resources in the Relocation-Request-Acknowledge.
1.6. The MSC passes the information from the Relocation-Request-Acknowledge to the macro-RNC in the Relocation-Command message.
1.7. The macro-RNC sends the Physical-Channel-Reconfiguration message to the UE from the information in the Relocation-Command message.
1.8. The UE synchronises with the LP-AP. At this point the LP-AP does not know which UE has synchronised so the LP-AP does not send the Relocation-Detect immediately.
1.9. The UE sends Physical-Channel-Reconfiguration-Complete containing the identifier assigned to the UE in step 1.5.
1.10. The LP-AP sends Relocation-Complete to the LP-AP RNC. This contains information about which UE has connected to the LP-AP.
1.11. The LP-AP RNC sends Relocation-Detect to the MSC to trigger the re-routing of the user data from the macro-RNC to the LP-AP RNC.
1.12. The LP-AP RNC sends Relocation-Complete to the MSC to trigger the freeing of UE related resources in the macro-RNC.

In this scenario there is a slight delay in the sending of the Relocation-Detect message from the RNC to the MSC as the message cannot be sent until the detected UE is identified. This does not cause a problem to the MSC as the MSC has no expectation of the timing of messages, it is only concerned with the sequence of messages which remains unchanged.

The issues described for the GSM solution above apply equally to this solutions, with the exception that the 3G temporary identity (the equivalent of the handover reference) is not limited to 8 bits, and may always be unique.

Detailed Hand-In Sequence for 3G with Specific Hand-In Resources

Figure 4:
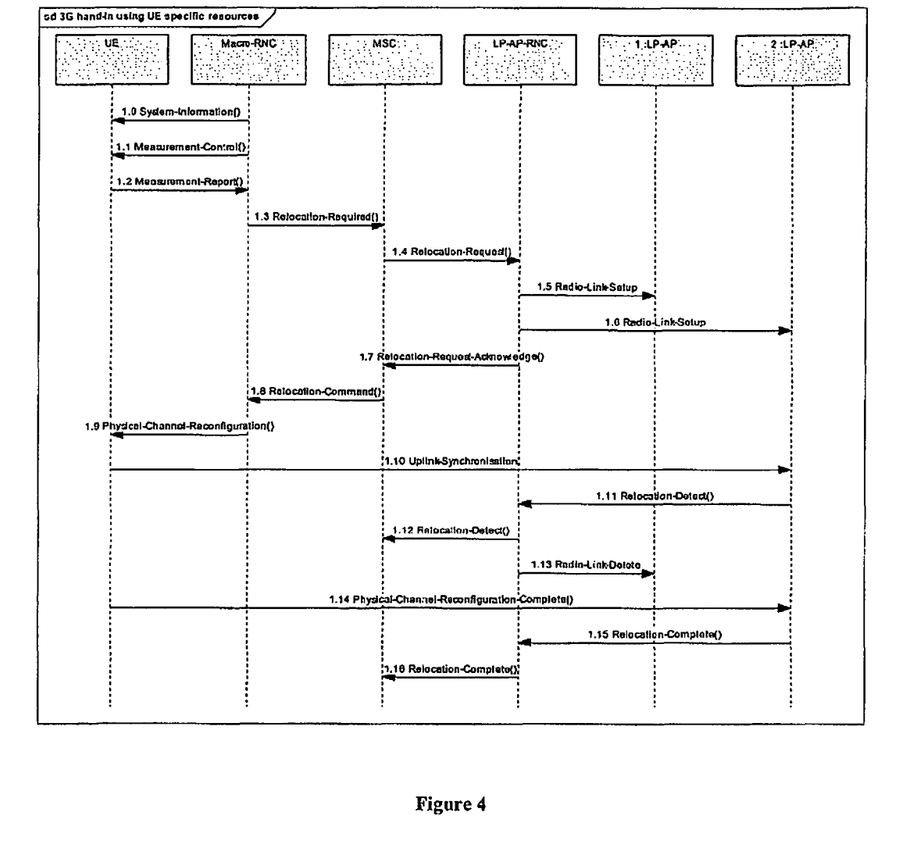
FIG. 4 is a message sequence chart describing a 3G handover method, using UE specific resources, in accordance with an aspect of the present invention.

This scenario is shown in FIG. 4. In this case, the LP-AP RNC allocates a unique set of resources for each hand-in and then configures the physical channel on all of the candidate APs.

The raw candidate list of APs contains all APs with the same CGI as that specified in the Relocation-Request message. The LP-AP RNC may optionally reduce the size of this raw candidate list using knowledge of the access control which is applied to the APs. An access control list that specifies which UEs can access which APs can be used to filter the raw list of APs to the smaller subset of such APs where the handed-in UE is allowed to operate. Only LP-APs where the UE is allowed to operate and with the appropriate CGI are considered candidate cells.

1.0. The macro-RNC sends the configured frequencies and scrambling codes of its neighbour cells.
1.1. The macro-RNC specifies the criteria under which the UE should issue a measurement report.
1.2. The UE sends a measurement report indicating that a specified neighbour cell meets the criteria specified by the macro-RNC.
1.3. The macro-RNC looks-up the CGI of the neighbour cell and sends it in a Relocation-Required message to the MSC.
1.4. The MSC identifies the RNC for the target cell and sends a Relocation-Request to the target RNC.
1.5. The LP-AP RNC assigns an identifier for the UE, and physical channel resources for the hand-in. The LP-AP RNC generates a candidate list of cells that may be the target for the hand-in based on the CGI and the UE identity. The RNC then instructs the first LP-AP to setup a radio link for the hand-in.
1.6. The LP-AP RNC instructs all of the other candidate LP-APs to setup a radio link for the hand-in.
1.7. The LP-AP RNC acknowledges the Relocation-Request and includes the UE identifier and the physical channel resources to be used for this hand-in.
1.8. The MSC passes the information from the Relocation-Request-Acknowledge to the macro-RNC in the Relocation-Command message.
1.9. The macro-RNC sends the Physical-Channel-Reconfiguration message to the UE from the information in the Relocation-Command message.

1.10. The UE synchronises with one of the LP-APs. As resources have been allocated specifically for this hand-in, the LP-AP knows which UE has appeared.

1.11. The LP-AP tells the RNC that the UE has appeared.

1.12. The LP-AP RNC sends Relocation-Detect to the MSC to trigger the re-routing of the user data from the macro-RNC to the LP-AP RNC.

1.13. The LP-AP RNC deletes the radio links allocated for this hand-in on all of the LP-APs where the UE did not appear.

1.14. The UE sends Physical-Channel-Reconfiguration-Complete containing the identifier assigned to the UE in step 1.5.

1.15. The LP-AP sends relocation complete to the RNC.

1.16. The LP-AP RNC sends Relocation-Complete to the MSC to trigger the freeing of UE related resources in the macro-RNC.

In this scenario it is possible that there are no candidate cells for the hand-in. This can occur if using an access control mechanism and the UE attempting the hand-in is not allowed on any of the cells with the specified CGI. In this case the LP-AP RNC can reject the hand-in using the Relocation-Failure message.

The issues described for the GSM solution above do not apply to this solution, with the exception that multiple APs may still detect the hand-in, in which case the same issue as described above still applies.

Detailed Hand-In Sequence for GSM with Specific Hand-In Resources

Figure 5:
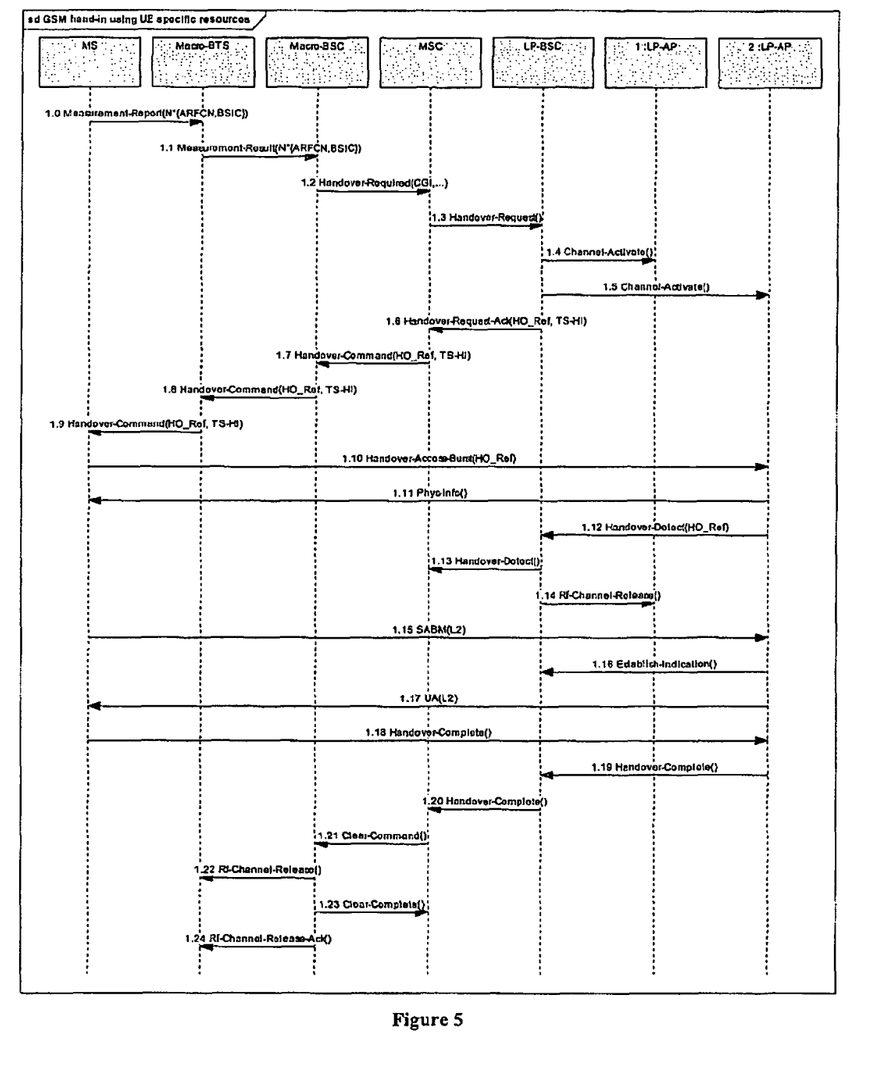
FIG. 5 is a message sequence chart describing a GSM handover method, using MS specific resources, in accordance with an aspect of the present invention.

The GSM version of the hand-in with specific resources employs the corresponding changes compared to the pre-configured resources as are described for the 3G situations above. It is shown in FIG. 5.

It will be appreciated that the term "low power" is used herein to describe power outputs of 500 mW or less.

The invention claimed is:

1. A method of cellular radio telecommunication handover of a mobile station (MS) to a plurality of common cell identity base transceiver stations (BTSs) comprising the steps of:
   (i) receiving at least one measurement report from the MS at a controller, wherein the at least one measurement report includes information obtained directly from at least one common cell identity;
   (ii) allocating an air interface handover resource and handover reference number for use by the mobile station, wherein the air interface handover resource is unique to the handover to be executed, but common between possible target BTSs, where the handover resource is provided on every BTS that is a possible target BTS;
   (iii) scanning a channel on at least some of the common cell identity BTS for communication from the mobile station using said air interface handover resource and handover reference number; and
   (iv) receiving communication from the mobile station on one of the common cell identity BTSs, thereby identifying that common cell identity BTS as a target handover common cell identity BTS;
   (v) completing handover between the mobile station and the target handover common cell identity BTS, and
   (vi) releasing the air interface handover resource from remaining possible target common cell identity BTS(s) other than the identified target handover common cell identity BTS.

2. The method of claim 1 wherein the plurality of common cell identity BTSs is a network of Low Power Access Points which share a common cell identity.

3. The method of claim 1, wherein the MS is permitted to connect to only a sub-set of the possible target common cell identity BTSs.

4. The method of claim 1, further comprising the steps of passing data corresponding to the handover to a low power access point controller and updating a handover resource associated with the non-target common cell identity BTSs.

5. The method of claim 1, wherein, the air interface handover resource comprises a pre-determined handover channel and the target handover common cell identity BTS initiates an intra-cell handover of the mobile station to a traffic channel to keep a predetermined handover channel free for other mobile station handovers.

6. The method of claim 5 comprising scanning the predetermined handover channels on each common cell identity BTS for communication from the mobile station.

7. The method of claim 1, further comprising the steps of determining if more than one handover common cell identity BTS has received the communication from the MS, and selecting one of the plurality of handover common cell identity BTSs to complete step (v).

8. The method of claim 1, further comprising the steps of determining if more than one MS has transmitted the communication to the BTS simultaneously, and reverting at least one of the MSs to a prior BTS should this occur.

9. A cellular radio telecommunication handover system comprising:
   at least one controller;
   a plurality of common cell identity base transceiver stations (BTSs) and at least one mobile station (MS);
   wherein, the at least one mobile station is arranged to transmit at least one measurement report to the controller and, upon determining that a handover is required to one of the plurality of common cell identity BTSs, an air interface handover resource and handover reference number are allocated for use by the mobile station wherein the air interface handover resource is unique to the handover to be executed, but common between possible target BTSs, where the air interface handover resource is provided on every BTS that is a possible target BTS, and wherein at least one of the plurality of the common cell identity BTS is arranged to scan a channel to receive a communication from the MS using said air interface handover resource and handover reference number thereby identifying that common cell identity BTS as a target handover common cell identity BTS and in response thereto the target handover common cell identity BTS is arranged to complete the handover of the mobile station with the air interface handover resource being released from use by remaining possible target common cell identity BTS(s) other than the identified target handover common cell identity BTS.

10. The system of claim 9, wherein the plurality of common cell identity base transceiver stations (BTSs) is a network of Low Power Access Points which share a common cell identity.

11. The system of claim 9, wherein the air interface handover resource is unique to possible target common cell identity BTSs.

12. The system of claim 11, wherein the MS is arranged to be permitted to connect to only a sub-set of the possible target common cell identity BTSs.

13. The system of claim 9, wherein the at least one controller comprises a source controller and a low power access point target controller arranged to receive data corresponding to the handover from the source controller and being further arranged to update a handover resource associated with non-target common cell identity BTSs.

14. The system of claim 9 wherein the plurality of common cell identity BTSs is arranged to scan the predetermined handover channel for communication from the mobile station.

15. A mobile station (MS) in a system that provides for cellular radio telecommunication handover to a plurality of common cell base transceiver stations (BTSs), comprising:
   a processor causing the MS:
   to transmit at least one measurement report to a controller;
   to receive an air interface handover resource and handover reference number, wherein the air interface handover resource is unique to the handover to be executed, but common between possible target BTSs, where the air interface handover resource is provided on every BTS that is a possible target BTS;
   to scan a channel on at least some of the common cell identity BTSs; and
   to provide communication with one of the common cell identity BTSs using said air interface handover resource and handover reference number, thereby identifying that common cell identity BTS as a target handover common cell identity BTS, and completing handover between the mobile station and the target handover common cell identity BTS with the air interface handover resource being released from use by remaining possible target common cell identity BTS(s) other than the identified target handover common cell identity BTS.

16. The mobile station of claim 15 comprising any one of the following: mobile telephone, personal digital assistant, laptop computer.

* * * * *

UNITED STATES PATENT AND TRADEMARK OFFICE
CERTIFICATE OF CORRECTION

PATENT NO. : 8,538,429 B2
APPLICATION NO. : 11/995657
DATED : September 17, 2013
INVENTOR(S) : Neil Philip Piercy, Nicholas Dougall Johnson and David C. Brock

It is certified that error appears in the above-identified patent and that said Letters Patent is hereby corrected as shown below:

TITLE PAGE:

Page 1; item (73), Column 1, Line 1: Change "Camboune" to -- Cambourne --;

Page 2; item (56), Column 2, Line 2: Change "umatechology" to -- umatechnology --.

Signed and Sealed this
Twenty-third Day of September, 2014

Michelle K. Lee
*Deputy Director of the United States Patent and Trademark Office*